P. SANGOFF.
ANTISKIDDING DEVICE.
APPLICATION FILED AUG. 6, 1917.
1,285,406.
Patented Nov. 19, 1918.
2 SHEETS—SHEET 1.
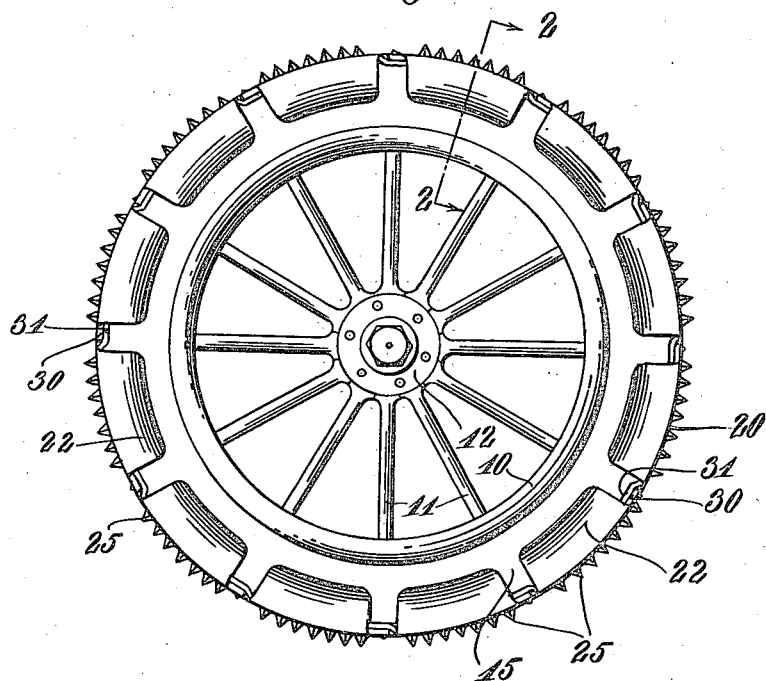
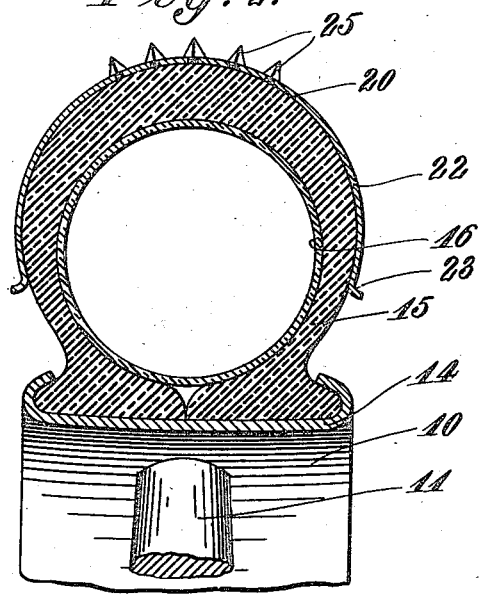
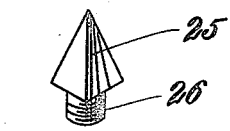
INVENTOR.
Peter Sangoff.
HIS ATTORNEY P. SANGOFF.
ANTISKIDDING DEVICE.
APPLICATION FILED AUG. 6, 1917.
1,285,406.
Patented Nov. 19, 1918.
2 SHEETS—SHEET 2.
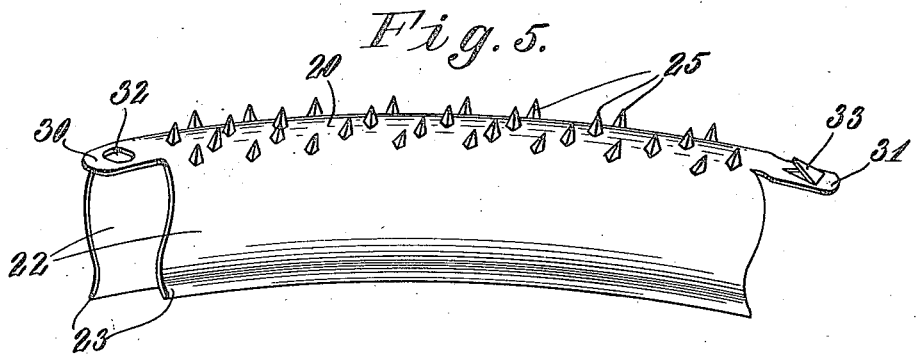
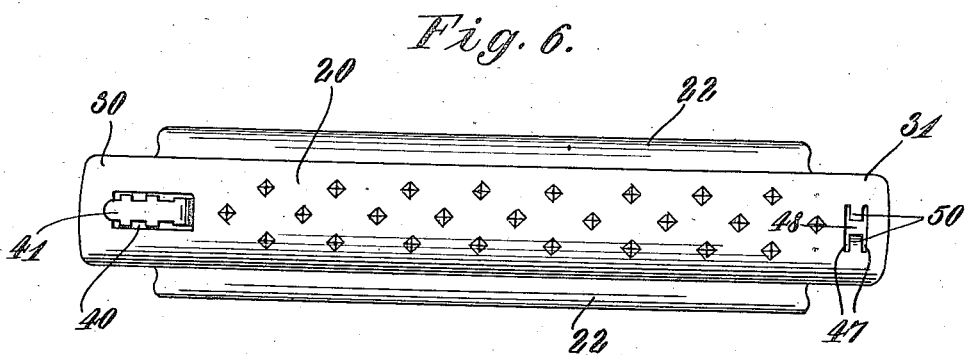
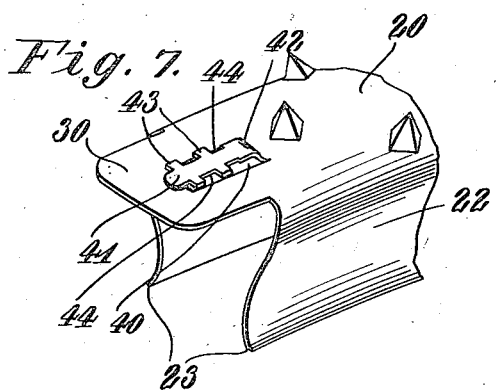 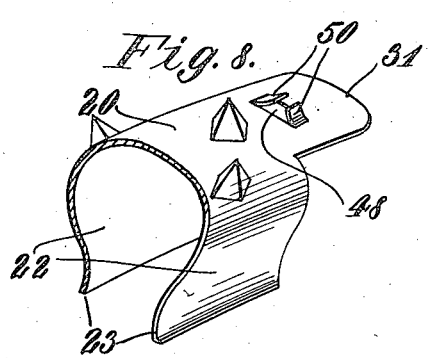
INVENTOR.
Peter Sangoff.
BY
HIS ATTORNEY

UNITED STATES PATENT OFFICE.

PETER SANGOFF, OF WORCESTER, MASSACHUSETTS.

ANTISKIDDING DEVICE.

1,285,406.

Specification of Letters Patent.

Patented Nov. 19, 1918.

Application filed August 6, 1917. Serial No. 184,594.

*To all whom it may concern:*

Be it known that I, PETER SANGOFF, a subject of the Czar of Russia, resident of Worcester, county of Worcester, and State of Massachusetts, have invented certain new and useful Improvements in Antiskidding Devices, of which the following is a specification.

This invention relates to improvements in devices for preventing skidding of vehicle wheels, and has as its principal object the provision of means which may be readily applied to existing types of wheels without any change whatever, and by reason of which the wheel is prevented from skidding or sliding over the surface in an undesirable manner.

Another object is to provide such devices in forms comprised of sectional elements, and therefore adjustable to a relatively wide range of wheels of the type mentioned.

These and other like objects are attained by the novel construction and combination of parts hereafter described and shown in the accompanying drawings, forming a material part of this disclosure, and in which—

Figure 1 is a side elevational view of a conventional type of wheel indicating the application of the invention.

Fig. 2 is an enlarged transverse sectional view taken through the wheel tread and rim on line 2—2 of Fig. 1.

Fig. 3 is a perspective view showing one type of spur used in connection therewith.

Fig. 4 is a similar perspective view showing another type of spur.

Fig. 5 is a perspective view showing one of the plate elements of the device in detail.

Fig. 6 is a top plan view showing a modified form of construction.

Fig. 7 is an enlarged fragmental perspective view showing the engaging means formed at one end of the plate, and Fig. 8 is a similar perspective view showing the opposite end of the plate.

The wheels 10, here shown to be of the ordinary type of construction, are provided with spokes 11, radiating from a hub 12, and having a rim 14, to which is secured the tread or shoe 15, containing a flexible inner tube 16 as is common with such variety of wheels.

The device is comprised of a plurality of arcuate plates 20, having curved lateral flanges 22, suited to tightly engage with the exterior of the tread 15, and provided with outturned lower edges 23, thereby permitting the flanges to be forced over the tread, preferably at such times as the inner tube 16 is deflated. Rigidly secured on the upper surfaces of the plates 20 are a plurality of pyramidal spurs 25, the same having sharp points and which are secured to the plates by screw-threads 26, or rivets, or if preferred, chisel pointed spurs 27 having like shanks 28, may be used.

These several segmental plates have extending end tabs 30 and 31, the same being prolongations of the plates 20, and in one of the tabs 30, is formed an opening 32, receptive of the hook shaped elements 33, formed by piercing the material of the tabs 31 and pressing the V shaped prong or hook 33 upwardly so that it will engage in the corresponding opening 32, formed in the opposite tab 30, thereby providing means whereby all of the several plates are interengaged along the surface of the tread, forming a continuity of plates which are securely held in place when the inner tube 16 is expanded by inflating in the ordinary manner.

In the type shown in Figs. 6 to 8 inclusive, a similar construction is observable, the difference being in the interconnecting means, which in the latter case, comprise a longitudinal slot 40, into which extends a tongue 41, connected at its base 42 integrally with the plate 20, the tongue having extending projections 43, between which are spaces 44, as is clearly shown in Figs. 6 and 7.

The opposite end of the plate is provided with parallel transverse slots 47, connected by a space 48, into which extend oppositely disposed projections 50, engageable within the spaces 40 when the tongue 41 passes through the slot 47, thereby engaging the ends of the plate firmly together.

From the foregoing it will be seen that a simple and effective device has been disclosed which is capable of being readily applied to the exterior of a vehicle tread and which will effectually prevent the same from slipping in any direction upon the ground surface irrespective of its condition.

Having thus described my invention what I claim as new and desire to secure by Letters Patent, is—

1. An anti-skidding device for vehicle wheels of the character described, comprising a plurality of arcuate plates adapted to tightly engage with the tire or wheel tread and to carry a plurality of spurs, extensions at both ends of each of said plates, means stamped out of the material of one of said extensions and the other of said extensions perforated for the reception of said means upon the assembling of the device, adapted to form a continuity of plates securely held on a tire upon the inflation thereof.

2. An anti-skidding device for vehicle wheels of the character described, comprising a plurality of arcuate plates adapted to tightly engage with the tire of the wheel and to carry a plurality of spurs, extensions at both ends of each of said plates, a tongue stamped out of the material of one of said extensions and connected at its base to said plate-extension, laterally extending projections on said tongue providing intermediary spaces, and H-formed slots at the other end of said plate and extension thereof, oppositely disposed tongues formed in said slots and adapted to engage the spaces between the projections on the tongue of the adjoining plate extension for locking the plates together upon the assemblage of the device upon a tire, for forming a continuity of plates securely held upon the tire after the inflation thereof.

In testimony whereof I have affixed my signature.

PETER SANGOFF.